Oct. 27, 1936.                H. D. LATHROP                2,059,003
                         DUMP PAN AND WEIGH CAN
                            Filed July 3, 1935
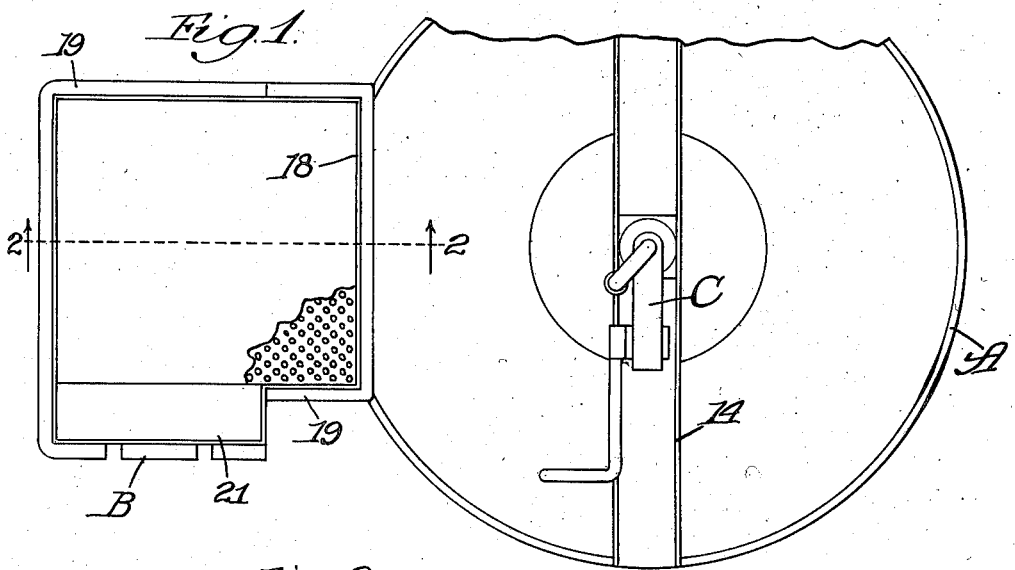
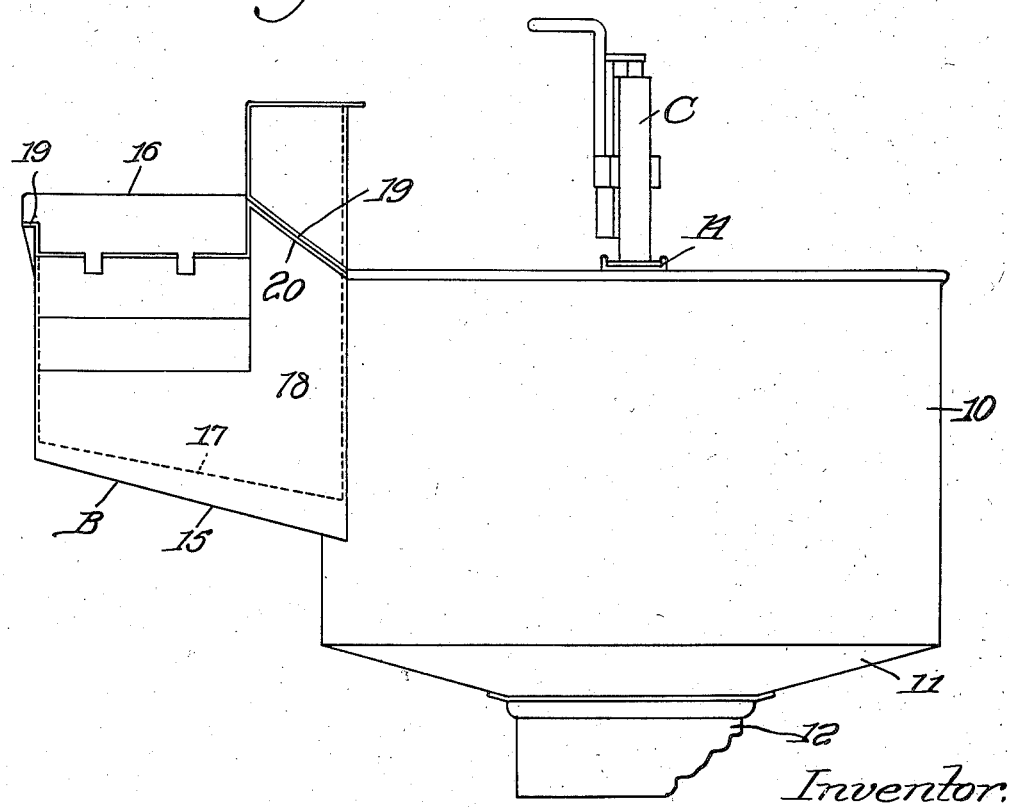
Inventor:
Harry D. Lathrop,
By Dyrenforth, Lee, Chritton & Wiles,
Attys.

Patented Oct. 27, 1936

2,059,003

UNITED STATES PATENT OFFICE 2,059,003

DUMP PAN AND WEIGH CAN

Harry D. Lathrop, Chicago, Ill.

Application July 3, 1935, Serial No. 29,753

8 Claims. (Cl. 210—155)

This invention relates to a dump pan and weigh can and more particularly to apparatus adapted for the straining and weighing of milk. This application is a division of my co-pending application Serial No. 4,569 for Weigh can and valve mechanism.

An object of the invention is to provide improved means for straining and weighing milk. Other specific objects and advantages will appear as the specification proceeds.

The invention is illustrated, in a preferred embodiment, by the accompanying drawing, in which—

Figure 1 is a plan view of apparatus embodying my invention; and Fig. 2, a view in elevation and part sectional view taken as indicated at line 2 of Fig. 1.

In the illustration given, A designates a weigh can; B, a dump pan communicating with weigh can A; and C, valve-raising mechanism of well known construction.

The weigh can A may be of any suitable construction. In the illustration given, it comprises a cylindrical tank 10 having a frusto conical bottom 11 terminating in a discharge outlet 12. At its top, the weigh can is equipped with a transverse bridge 14 which supports the valve-raising mechanism C. Suitable apparatus (not shown) of well known construction is employed to suspend the can A and to weigh the can and its contents.

The dumping vessel or pan B may be of any suitable construction. In the illustration given, it is radially disposed with respect to can A, and it consists of an outer casing member 15 secured to can A, and an inner or removable sieve member 16 telescopically received within the outer pan 15. The outer pan 15 is provided with a downwardly inclined bottom, and at its front end opens into can A. The inner pan or sieve 16 is provided with a perforated bottom 17 and a perforated front wall 18. The inclinations of wall 17 is not as great as that of wall 15, thus providing a flow passage for the milk passing through the bottom wall 17 into tank A. The perforated walls 17 and 18 have very minute openings therein but, for the purpose of illustration, such openings are shown in an exaggerated size in the drawing. The inner pan 16 is provided at its three sides with a marginal flange 19 overlapping the flange 20 of the outer fixed pan 15. On one side, the marginal flange 19 is cut away along the inclined side 21. The inner pan 19 is telescopically received within the outer pan and may be removed for cleaning.

In the operation of the mechanism, the milk is poured into the dump pan B, the milk passing downwardly through the perforated bottom 17 and the front wall 18. The space between wall 17 and wall 15 is progressively enlarged downwardly so as to take care of the increased milk flow passing through the perforated bottom. The inner dump pan 16 with its perforated bottom and front walls enables the milk to be readily strained before it enters the weigh can and, at the same time, it is in convenient position for removal when it is desired to clean the straining surfaces.

The foregoing detailed description has been given for clearness of understanding only, and no unnecessary limitations should be understood therefrom, but the appended claims should be construed as broadly as permissible, in view of the prior art.

I claim:

1. In combination with a weigh can, a dump pan radially disposed outside of said weigh can but communicating therewith at its front end, and a removable inner pan telescopically received within said outer pan and having minute perforations in its front and bottom wall.

2. In combination with a cylindrical weigh can, a dump pan radially disposed outside of said weigh can but communicating at its forward end with said weigh can, and a removable inner pan telescopically received within said outer pan and provided with minute perforations in its front and bottom wall, said inner pan being provided with marginal flanges extending over the margin of said outer pan and said inner pan having its bottom wall downwardly inclined toward said weigh can and suspended above the bottom wall of said outer pan to provide a flow passage therebetween.

3. In combination with a weigh can, a dump pan radially disposed outside of said weigh can but communicating therewith at its front end, and a removable inner pan telescopically received within said outer pan and having minute perforations in its front wall.

4. In combination with a weigh can, a dump pan radially disposed outside of said weigh can but communicating therewith at its front end, and a removable inner pan telescopically received within said dump pan and provided with a bottom wall having minute perforations, said bottom wall of the inner pan being spaced from the bottom wall of said dump pan.

5. In combination with a weigh can, a dump pan radially disposed outside of said weigh can but communicating therewith at its front end, and a removable inner pan telescopically received within said dump pan and provided with a bottom wall having minute perforations, said bottom wall of the inner pan being downwardly inclined toward said weigh can and spaced from the bottom wall of said dump pan at such an angle as to provide a progressively increasing area toward the inner ends of said pans.

6. In combination with a cylindrical weigh can, a dump pan radially disposed outside of said weigh can but communicating at its forward end with said weigh can, and a removable inner pan telescopically received within said dump pan and provided with a wall having minute perforations, said inner pan being suspended within said dump pan by means of marginal flanges which engage said dump pan.

7. In combination with a weigh can, a dump pan disposed outside of said weigh can but communicating therewith at its front end, and a removable inner pan telescopically received within said outer pan and having minute perforations on its front wall, said inner pan having its bottom wall downwardly inclined toward said weigh can.

8. In combination with a weigh can, a dump pan disposed outside of said weigh can but communicating therewith at its front end, and a removable inner pan telescopically received within said outer pan and having minute perforations on the surfaces adjacent its bottom front edge.

HARRY D. LATHROP.